US012736938B2

(12) United States Patent
Seyfried

(10) Patent No.: US 12,736,938 B2
(45) Date of Patent: Sep. 15, 2026

(54) METHOD AND DEVICE FOR AUTOMATED PARAMETERISATION OF AN IO-LINK DEVICE

(71) Applicant: Balluff GmbH, Neuhausen a.d.F. (DE)

(72) Inventor: Christian Seyfried, Aichtal (DE)

(73) Assignee: BALLUFF GMBH, Neuhausen ADF (DE)

( * ) Notice: Subject to any disclaimer, the term of this patent is extended or adjusted under 35 U.S.C. 154(b) by 428 days.

(21) Appl. No.: 18/590,468

(22) Filed: Feb. 28, 2024

(65) Prior Publication Data

US 2024/0319700 A1 Sep. 26, 2024

(30) Foreign Application Priority Data

Mar. 20, 2023 (DE) ........................ 102023106865.2

(51) Int. Cl.
*G05B 19/05* (2006.01)

(52) U.S. Cl.
CPC ......... *G05B 19/052* (2013.01); *G05B 19/056* (2013.01); *G05B 2219/1214* (2013.01); *G05B 2219/13111* (2013.01)

(58) Field of Classification Search
CPC ................ G05B 19/052; G05B 19/056; G05B 2219/13111; G05B 2219/1214
See application file for complete search history.

(56) References Cited

U.S. PATENT DOCUMENTS 11,146,425 B2 * 10/2021 Bagalá ..................... H04B 3/00
11,704,261 B2 * 7/2023 Köhler .................... G06F 13/20 710/104
2013/0204821 A1 * 8/2013 Keith, Jr. ................ G06F 11/26 706/46
2019/0327662 A1 * 10/2019 Franz .................... H04W 84/20
2020/0278942 A1 * 9/2020 Sobelman ........... G06F 13/4027
2020/0412571 A1 * 12/2020 Campbell ............... H04L 12/40
2022/0260960 A1 * 8/2022 Gerwig .............. G05B 19/0423
2025/0068575 A1 * 2/2025 Witte ................ H04L 12/40032
2025/0139045 A1 * 5/2025 Schwagmann ..... G06F 13/4068

FOREIGN PATENT DOCUMENTS

DE 102009013303 A1 9/2010
DE 102022103406 B3 5/2023

* cited by examiner

*Primary Examiner* — Henry Tsai
*Assistant Examiner* — Christopher A Daley
(74) *Attorney, Agent, or Firm* — GableGotwals

(57) ABSTRACT

In the case of the method and the device described here for automated parameterisation of at least one IO-Link device (300-310) connected, via an IO-Link connection (315-325) using communication technology, to a device (330) having IO-Link Master functionalities for a predetermined intended use (410) of at least one IO-Link device (300-310) by means of a configuration assistant (400), it is in particular provided that on the basis of the intended use (410) by means of an expert system (430) which is based on an artificial neural network and/or is rule-based, by means of which information (435) relevant for the parameterisation is automatically determined by means of user (445) inputs (440) guided by a configuration assistant (400) serving as a front end for the expert system (430), and a parameter set (455) suitable for the preferably application-related intended use (410) is automatically created for the parameterisation from the determined information (435) relevant for the parameterisation.

15 Claims, 5 Drawing Sheets

^ Vibration Advanced Configuration

| Index (Subindex) | Name | Value | | Read All |
|---|---|---|---|---|
| 8450 (0) | Vibration Time Window (rw) | SemiFast 250ms-2 | | READ |
| 8451 (1) | Vibration General Configuration Response Delay (rw) | 1000 | ms | READ |
| 8451 (2) | Vibration General Configuration Lower Bandwith Limit (rw) | 10 | ms | READ |
| 8451 (3) | Vibration General Configuration Upper Bandwith Limit (rw) | 3199 | ms | READ |

^ Vibration Velocity Alarm Configuration

| Index (Subindex) | Name | Value | | Read All |
|---|---|---|---|---|
| 8455 (1) | Vibration Velocity RMS Alarm Configuration Pre-Alarm X (rw) | 12500 000 | mm/s | READ |
| 8455 (2) | Vibration Velocity RMS Alarm Configuration Main-Alarm X (rw) | 12500 000 | mm/s | READ |
| 8455 (3) | Vibration Velocity RMS Alarm Configuration Pre-Alarm Y (rw) | 12500 000 | mm/s | READ |
| 8455 (4) | Vibration Velocity RMS Alarm Configuration Main-Alarm Y (rw) | 12500 000 | mm/s | READ |
| 8455 (5) | Vibration Velocity RMS Alarm Configuration Pre-Alarm Z (rw) | 12500 000 | mm/s | READ |
| 8455 (6) | Vibration Velocity RMS Alarm Configuration Main-Alarm Z (rw) | 12500 000 | mm/s | READ |
| 8455 (7) | Vibration Velocity RMS Alarm Configuration Pre-Alarm Magnitude (rw) | 12500 000 | mm/s | READ |
| 8455 (8) | Vibration Velocity RMS Alarm Configuration Main-Alarm Magnitude (rw) | 12500 000 | mm/s | READ |
| 8455 (9) | Vibration Velocity RMS Alarm Configuration Enable Alarms X (rw) | | | READ |
| 8455 (10) | Vibration Velocity RMS Alarm Configuration Enable Alarms Y (rw) | | | READ |
| 8455 (11) | Vibration Velocity RMS Alarm Configuration Enable Alarms Z (rw) | | | READ |
| 8455 (12) | Vibration Velocity RMS Alarm Configuration Enable Alarms Magnitude (rw) | | | READ |

v Vibration Velocity Severity Configuration v Vibration Acceleration Alarm Configuration

Fig. 2

METHOD AND DEVICE FOR AUTOMATED PARAMETERISATION OF AN IO-LINK DEVICE

CROSS-REFERENCE TO RELATED APPLICATIONS

This United States application claims priority to German Patent Application No. 10 2023 106 865.2 filed 20 Mar. 2023 which is incorporated herein by reference.

The invention relates to the configuration or parameterisation of an IO-Link device, e.g. a sensor arrangement connected via an IO-Link using communication technology for monitoring the state of technical equipment.

PRIOR ART

Sensor arrangements e.g. for monitoring the state of technical equipment by means of a known "IO-Link" communication connection are known in the prior art. Such sensor arrangements are able to connect simply and quickly via an "IO-Link" connection and can be integrated relatively simply and reliably into an existing technical equipment.

For example, "condition monitoring sensors" developed by the present applicant detect different physical parameters, e.g. the vibration, temperature, humidity and/or ambient pressure of technical equipment. Therefore, the technical state, for example, of a machine, industry system and of associated components can be monitored. The condition monitoring sensors thus enable efficient and trouble-free operation of such a machine or system and therefore significantly increase their effectiveness.

The physical parameters detected by the condition monitoring sensors are, for example, pre-processed and interpreted by the latter by means of evaluation electronics integrated therein, and deliver corresponding results data via an IO-Link to a higher-level system of the respective machine or system.

These sensors can be conveniently parameterised based on a standardised "IO-Link" protocol, and the evaluation in the sensor can be individually adapted to the respective technical application or purpose.

A corresponding condition monitoring sensor emerges from DE 10 2020 105 712 A1, which is used to monitor a clamping force exerted on a component by a clamping element of a clamping device. The sensor device comprises at least one strain gauge which can be arranged on a surface of the clamping element of the clamping device and can be deformed by the clamping force. Furthermore, a transmission modular unit connected to the strain gauge and based on electromagnetic transmission technology is provided for detecting a voltage, which is a measure for the deformation of the strain gauge. In addition, the device comprises an antenna element connected to the transmission modular unit for sending a signal characteristic of the detected voltage and for receiving electromagnetic energy for supplying the transmission modular unit and the strain gauge with electricity.

DE 10 2020 213 982 B3 discloses a method for commissioning a pneumatic actuator device, which comprises a pneumatic drive cylinder and a pneumatic control module fixed on the pneumatic drive cylinder, wherein several commissioning steps to be carried out for the commissioning are displayed by means of a graphic display device separate from the control module, in particular a tablet computer or a mobile telephone, and wherein a control module state is transmitted from the control module to the display device via a communication connection between the control module and the display device, and the commissioning steps are displayed with regards to the transmitted control module state.

The use of an "IO-Link connection" for connecting so-called "IO-Link devices" is known, for example, from DE 10 2009 013 303 A1. These "devices" are known sensors and actuators. The connection of further field devices, in particular also of security-relevant field devices, which require parameterisation, occurs in the prior art in a conventional manner, i.e. by direct connection to a field bus or via the known programming interface REST-API.

According to the prior art, there are two possibilities for parameterising IO-Link devices concerned here. In both approaches, individual parameters (frequently more) must be adapted.

On the one hand, the parameterisation can take place via an IO-Link device description file (IODD). The format of the IODD is standardised by the "IO-Link consortium" and can be interpreted graphically by corresponding software modules. Here, a list of all the parameters described in the IODD (possibly with groupings) is established. The individual parameters are displayed with names and the respective register. The values can be changed in the permissible range and written to the device. The user must comprehend the meaning and effect of the individual parameters by the provided documentation (handbook) and apply it to the application.

Alternatively, the parameterisation can take place without an IODD, and specifically via a controller or corresponding software module. With this approach however, the registers must be taken from the documentation manually and the corresponding values are written into the sensors. This method is used frequently with less complex IO-Link sensors. Generally, the parameterisation takes place here directly via a control program provided in a programmable logic controller (PLC).

DISCLOSURE OF THE INVENTION

The invention is based on the object of enabling the automated parameterisation in particular of further IO-Link devices, including further field devices and in particular also security-relevant field devices, as simply as possible, i.e. with the lowest possible technical complexity.

In so doing, the technical requirements for the installation of such devices or for setting up such devices should in particular also be simplified for a modified or new application or intended use.

Thus, the invention proposes a method and a device for simplified or maximally automated configuration or parameterisation of one or more IO-Link devices concerned here, in particular of an aforementioned IO-Link-based sensor arrangement/apparatus.

In this case, it is accepted that the corresponding IO-Link devices or field devices, e.g. the mentioned sensors, having the ability to pre-process or further process data recorded on-board. Such further processing also comprises the implementation of switching signals for a length or position measuring system.

Therefore, it is possible to carry out the configuration or parameterisation of these devices externally. In addition, by setting individual parameters, it is possible to adapt on-board data processing or data evaluation provided in a mentioned sensor or position measuring system to the requirements of the respective application or respective intended use.

It should also be noted that the configuration/parameterisation of complex IO-Link devices, such as the aforementioned condition monitoring sensors, requires a significant amount of transfer effort on the part of the respective user, in order to transfer application-specific knowledge into individual technical sensor parameters. In order to be able to provide this transfer effort, the user requires in particular technical expert knowledge about the respective application or intended use, e.g. when monitoring the state of a machine or system part by means of a vibration analysis, as well as about the IO-Link device or devices to be parameterised accordingly (e.g. vibration sensors). To this end, the user must identify all parameters relevant for the application, correctly interpret their meaning and effect on the intended use or application case from the documentation, select parameter values suitable for the intended use or application case, and transmit or upload the selected parameters one after the other in the correct order to the corresponding IO-Link device (e.g. sensor). In the process, dependencies between the parameters must also be considered.

With the method or device proposed here, the data input, dependent on the respective application, e.g. monitoring application, is automatically converted into a suitable parameter set by means of an expert system, which parameter set can be uploaded onto the respective sensor. The individual parameters uploaded in the process are used to preset the data pre-processing on the sensor and the data transmission of the pre-processed sensor data according to the respective application by means of calculations.

According to a first aspect of the method according to the invention for automated parameterisation of at least one IO-Link device connected using communication technology to an IO-Link Master via an IO-Link or to a device having IO-Link Master functionalities or providing such functionalities, e.g. via a "CMTK" or "IO-Fly" from IFM mentioned in the following, for a predetermined intended use (or use case) of the at least one IO-Link device by means of a configuration assistant, it is in particular provided that on the basis of the intended use, by means of an expert system, by means of which information relevant for the parameterisation is automatically determined by user inputs guided by means of a configuration assistant, wherein a parameter set suitable for the intended use is automatically created for the parameterisation from the determined information relevant for the parameterisation. A correspondingly created parameter set, or the corresponding parameter data, can then be transmitted automatically to the at least one sensor, for example by means of a target platform, e.g. by means of an IO-Link Master or an aforementioned "condition monitoring toolkit" (CMTK) that is known per se.

According to a second aspect of the method according to the invention, it can also be provided that the at least one IO-Link device is automatically configured for the predetermined intended use based on the transmitted parameter set.

According to a further aspect of the method according to the invention, it can further be provided that the suitable parameter set is created using a machine learning approach.

According to a further aspect of the method according to the invention, it can also be provided that on the basis of the information relevant for the parameterisation and dependent on the intended use, the machine learning approach is used to both determine parameters relevant for the parameterisation and to automatically determine parameter values suitable for the determined parameters.

According to a further aspect of the method according to the invention, as an alternative or in addition to the machine learning approach mentioned, it can be provided that a suitable parameter set is created in a rule-based manner. Furthermore, on the basis of information relevant for the parameterisation and dependent on the intended use, parameters relevant for the parameterisation can be determined and parameter values suitable for the determined parameters can be determined in a rule-based manner.

According to a still further aspect of the method according to the invention, it may be provided that dependencies or correlations between different parameters are considered when creating a parameter set suitable for the intended use.

According to a first aspect of the device according to the invention for the automated parameterisation of at least one IO-Link device connected to an IO-Link master via an IO-Link using communication technology for a predetermined intended use of the at least one IO-Link device, an expert system is provided which automatically creates a suitable parameter set for the parameterisation on the basis of information relevant to the intended use.

A parameter set created in this way can also be provided to a target platform, which then automatically transmits the corresponding parameters to a respective IO-Link device or field device. The expert system is used to automatically determine the information relevant for the parameterisation on the basis of guided inputs made by a user, with the inputs being made by a configuration assistant serving as a front end.

According to a second aspect of the device according to the invention, it can be provided that the at least one IO-Link device has a plug connector (e.g. of size M8 or M12) which provides an IO-Link communication protocol, wherein the at least one IO-Link device has the ability to further process a created parameter set in terms of data.

According to a further aspect of the device according to the invention, it can also be provided that the at least one IO-Link device is connected to the IO-Link master via a bidirectional IO-Link connection for communication, wherein the IO-Link master is connected to a programmable logic controller or a higher-level IT network via one or more Ethernet-based interfaces for data or communication purposes.

According to a further aspect of the device according to the invention, it can also be provided that data supplied by the at least one IO-Link device is further processed and analysed by means of the IT network regarding the respective intended use.

According to a further aspect of the device according to the invention, it can also be provided that the data delivered by the at least one IO-Link device is analysed in the IT network by means of an artificial neural network and/or by means of machine learning and/or in a rule-based manner.

According to a further aspect of the device according to the invention it can be provided that data delivered by the IT network as a result of the analysis is automatically converted into control actions for a system or machine by means of a programmable logic controller.

The method implemented by means of the expert system and by means of the configuration assistant serving as a front end, for configuration of IO-Link devices regarding the respective, application-oriented intended use enables the aforementioned creation and transfer of the mentioned parameter sets to be performed in as automated a manner as possible. In this case, the user only has to provide the expert system with knowledge about the respective application, using an intuitively guided procedure.

As a result, the user only has to deal with the respective application or intended use and provide the corresponding input data. The expert system-guided by the configuration assistant-then asks basic questions which are generally easy for the user to answer. In the method or device according to the invention, the required data input is thus automatically enriched with expert knowledge about the application and converted into a technical parameter set.

In the configuration process, the user is systematically and intuitively guided by specific dialogues that allow the user to contribute their application knowledge about the technical or electrical and/or mechanical situation of the respective use case. On the basis of the high degree of automation of the expert system, the user does not have to perform any or only a very low level of mental transfer activity. Instead, the user only has to deal with the configuration program and provide their input. Therefore, in particular no transfer effort and expert knowledge is required of the user.

The derivation or creation of a parameter set suitable for the respective application can take place through logical relations, i.e. rule-based, and/or through self-learning, AI-based algorithms.

The uploading of such a parameter set can then be carried out in a single routine. This process, therefore, significantly improves the efficacy and efficiency of the configuration of complex IO-Link devices.

BRIEF DESCRIPTION OF THE DRAWINGS

Exemplary embodiments of the invention are illustrated in the drawings and are explained in more detail in the following description.

FIG. 2 shows a schematic extract from a parameter list of an IO-Link-based sensor arrangement described below;

EXEMPLARY EMBODIMENTS OF THE INVENTION

Figure 1:
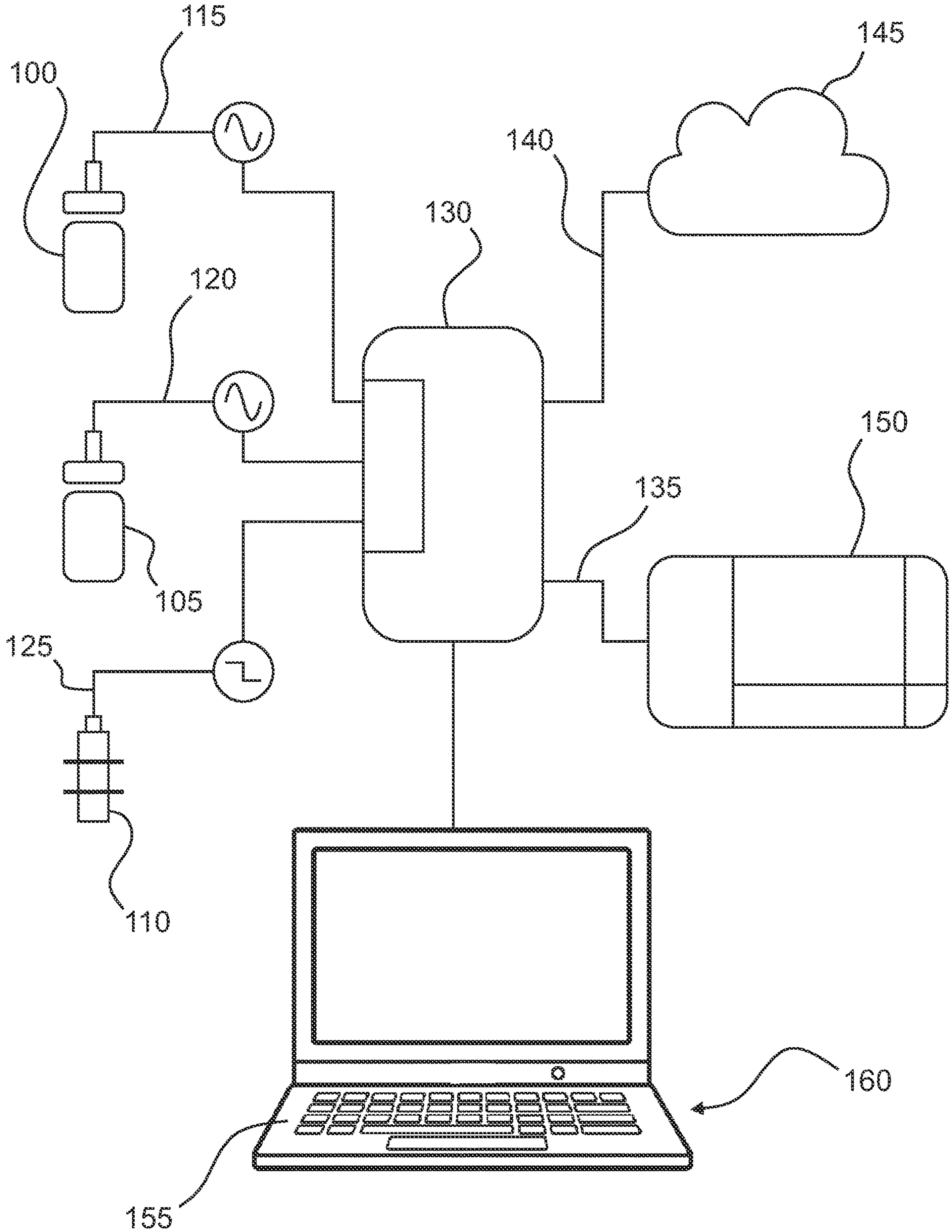
FIG. 1 shows a sensor arrangement for monitoring the state of a system component according to the prior art.

FIG. 1 shows a sensor arrangement according to the prior art, as an example of an arrangement of two vibration sensors 100, 105 and an inductive speed sensor 110, as well as a device, known per se, for its configuration or parameterisation. The sensor arrangement 100-110 shown is used to monitor the vibrations of a system or machine (not shown here) and is intended to trigger an alarm if a predetermined vibration level is exceeded.

In the shown exemplary embodiment, the three sensors 100, 105, 110 supply high-frequency analogue signals or values to an electronic diagnostic unit 130, e.g. an industrial PC, via respective analogue communication connections 115, 120, 125. The raw data 115, 120, 125 supplied by the sensors 100, 105, 110 is further processed by means of the diagnostic unit 130, in order to determine the possible existence of said alarm situation. From the diagnostic unit 130, correspondingly aggregated data is transmitted via a corresponding Ethernet or Internet Protocol (IP)-based communication connection 135, 140 to higher-level systems, in the present exemplary embodiment to the IT network of a "cloud computing" platform 145 and to a programmable logic controller (PLC) 150.

Configuration software 160 set up on a computer 155 is used to parameterise the diagnostic unit 130 and the sensors 100, 105, 110. However, in the monitoring scenario assumed here, the sensors 100, 105, 110 shown in FIG. 1 do not have the ability to process such parameterisation data "on board".

The parameters can be read into the computer 155 and/or written to the respective sensor 100, 105, 110 via a graphical user interface set up in the computer 155.

However, in order to configure even more complex sensors, such as the aforementioned, e.g. the "condition monitoring sensors" (hereinafter referred to as "CM sensors") developed and sold by the applicant, specifically for the respective application or the respective intended use of the sensors, a large number of parameters must be set manually one after the other by the user.

A CM sensor of the latest generation ("V2") has a total of around 700 pre-settable individual parameters, for instance. To parameterise a CM sensor, standardised "IODD" files (i.e. machine-readable text files) known per se are processed in order to generate a list of all the parameters required or intended for parameterising such IO-Link devices.

In addition, there are often complex dependencies between individual parameters. In order to set up a new application of the sensor arrangement shown in FIG. 1, at least 20-30 different parameters must therefore be set manually with great precision.

The extract of a parameter list shown in FIG. 2 illustrates the very high complexity involved in the parameter configuration of IO-Link devices concerned here using the example of the parameterisation of the two vibration sensors 100, 105 shown in FIG. 1 using so-called "IODD" files ("IODD"=IO-Link Device Description).

Individual parameters for the following two areas are only examples (or extracts):

1. "Vibration advanced configuration" and
2. "Vibration velocity alarm configuration".

The first area 1. is concerned firstly with the configuration of the time windows relevant for vibration detection, the specification of corresponding time values of which is decisive for the detection quality of vibrations. Suitable time values are essentially dependent on the respective application case, i.e. on the system part or machine to be measured. This is because vibration behaviour thereof, in particular the vibration frequencies that may occur, are decisive for the size of the respective time window to be set for vibration detection. For example, a pre-setting with a time window that is too small means that any vibrations that are detected are only taken into account incompletely, as there is no complete phase sequence. By contrast, a time window that is set too large can result in a vibration, or a corresponding oscillation, being detected relatively late or even too late, as too many complete phase sequences have to be evaluated.

Secondly, the first area 1. deals with the pre-setting of response delays ("event response delay" values) and the pre-setting of bandwidth values. The latter are used to limit a lower and upper bandwidth ("upper" and "lower bandwidth limit" values). The quality of the vibration detection can also be significantly improved by adapting the pre-settings to the respective application case. For example, the aforementioned bandwidth values can be adapted to the vibration behaviour to be expected in the respective application case in order to ensure that the specified and thus available bandwidths of the vibration sensors are sufficient for the detection and processing of detected vibrations, i.e. their vibration frequencies.

The second area 2. deals with the pre-setting of various parameters relating to the behaviour of pre-alarms and main alarms, which are triggered automatically when certain predeterminable vibration behaviour is detected. This is based on so-called "RMS" values of the vibration velocity of a vibration, whereby "RMS" corresponds to a root mean square ("RMS") calculation based on recorded vibration data.

These parameters relating to the alarm behaviour of the monitoring device in question must therefore be configured very precisely in order to ensure that an alarm is actually and reliably triggered in an alarm case that is characteristic of the respective application scenario.

Figure 3:
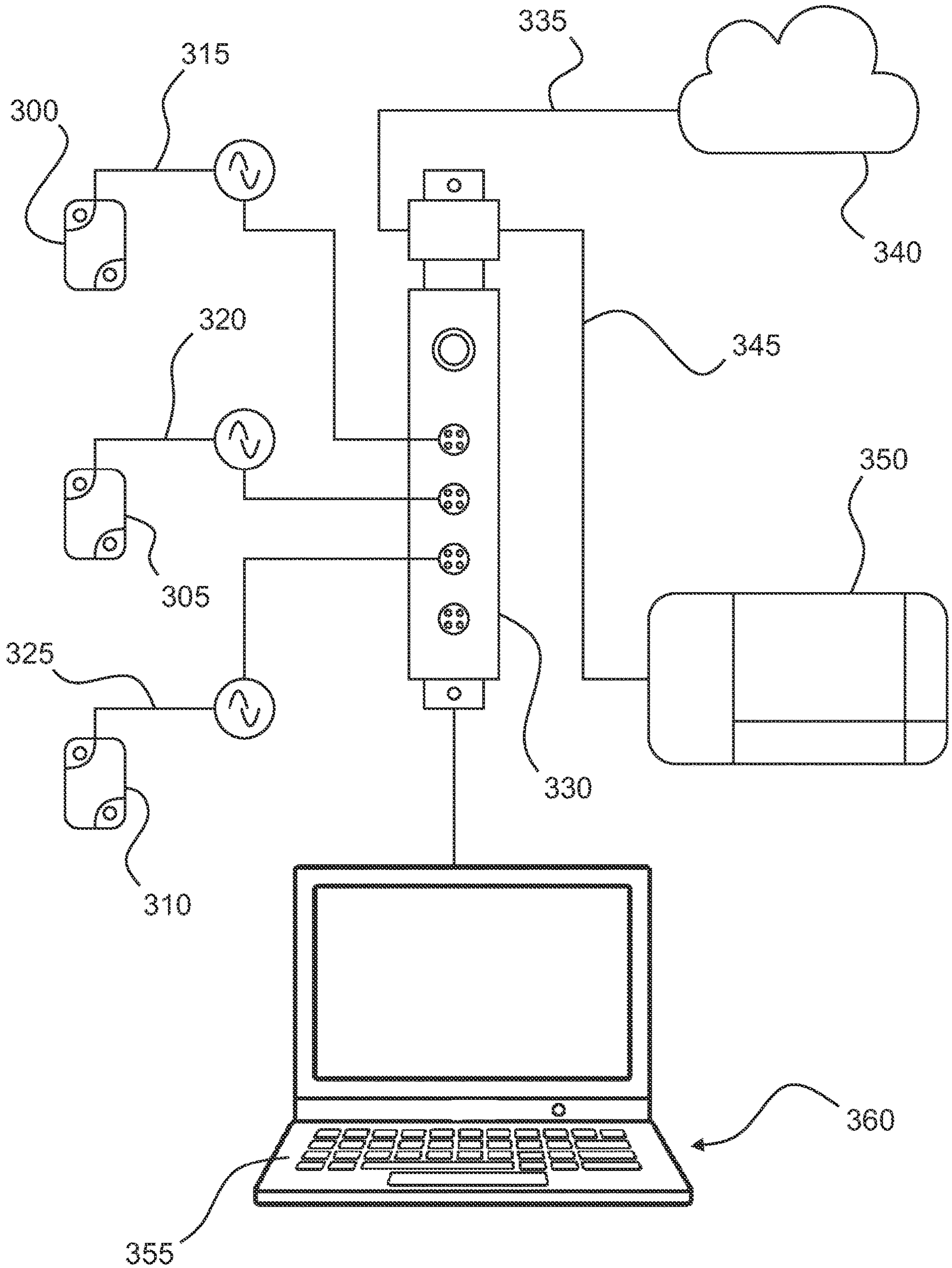
FIG. 3 shows an IO-Link-based sensor arrangement for monitoring the state of a system component according to the invention.

FIG. 3 shows an IO-Link-based sensor arrangement for monitoring the state of a system component to be monitored, in which the parameter configuration of the IO-Link devices 300, 305, 310 involved here can be carried out in according with the invention.

An "IO-Link" represents standardised IO technology (IEC 61131-9) in order to communicate with sensors and actuators. The high-performance point-to-point communication is based on the known 3-conductor sensor and actuator connection principle which does not place any additional requirements on the cable material. The "IO-Link" is thus not a field bus but a further development of an existing and tried and tested connection technology for sensors and actuators.

The IO-Link is functional and enables an enhanced diagnosis of sensors and actuators or simple and quick parameterisation through bidirectional communication. It enables fast communication with the three communication rates 4.8 k baud, 38.4 k baud and 230.4 k baud. It can also be implemented in a very small design and thus enables the miniaturisation of "intelligent" sensors and actuators.

The three IO-Link devices 300-310 shown in FIG. 3 are each a mentioned CM sensor, second generation (V2). This has an M12 plug connector which provides or supports the IO-Link communication protocol and in particular has the ability to further process the aforementioned parameterisation data "on board".

The CM sensors 300-310 are respectively connected to an IO-Link master 330 via bidirectional IO-Link connections 315, 320, 325. The IO-Link master 330 is likewise connected to a higher-level IT network 340, e.g. cloud computing platform, for data or communication purposes via a bidirectional IO-Link connection 335. In addition, the IO-Link master 330 is connected to a programmable logic controller (PLC) 350 via an ethernet or (internet protocol (IP)-based) communication connection 345.

In the IT network, the sensor data supplied by the CM sensors 300-310 can be further processed and analysed with regard to the respective present monitoring task (or application scenario). The sensor data can either be compared with empirical pre-determined threshold values, in order to output a warning message, or correspondingly analysed using a machine learning approach by means of an artificial neural network. Such a neural network can, for example, be trained in a manner known per se using sensor data generated in advance.

The warning message potentially delivered by the IT network can then be converted by means of the programmable logic controller 350 into corresponding control actions for the respectively monitored (not shown here) system or machine, by means of which an existing alarm case can be cancelled again.

According to the invention, the IO-Link master 330 is also connected to a computer 355 on which a configuration program 360 (or corresponding engineering tool) supplied for parameterisation of the CM sensors 300 is set up. The design and the functionality of the configuration program 360, which can either be implemented in the form of a configuration assistant and thus using a rule-based optimisation approach, or as an AI (artificial intelligence)-based optimisation approach, is illustrated schematically in FIG. 5. For example, a machine learning system (described in greater detail below on the basis of FIG. 4) using a neural network for automated configuration can be provided as an AI approach.

Figure 4:
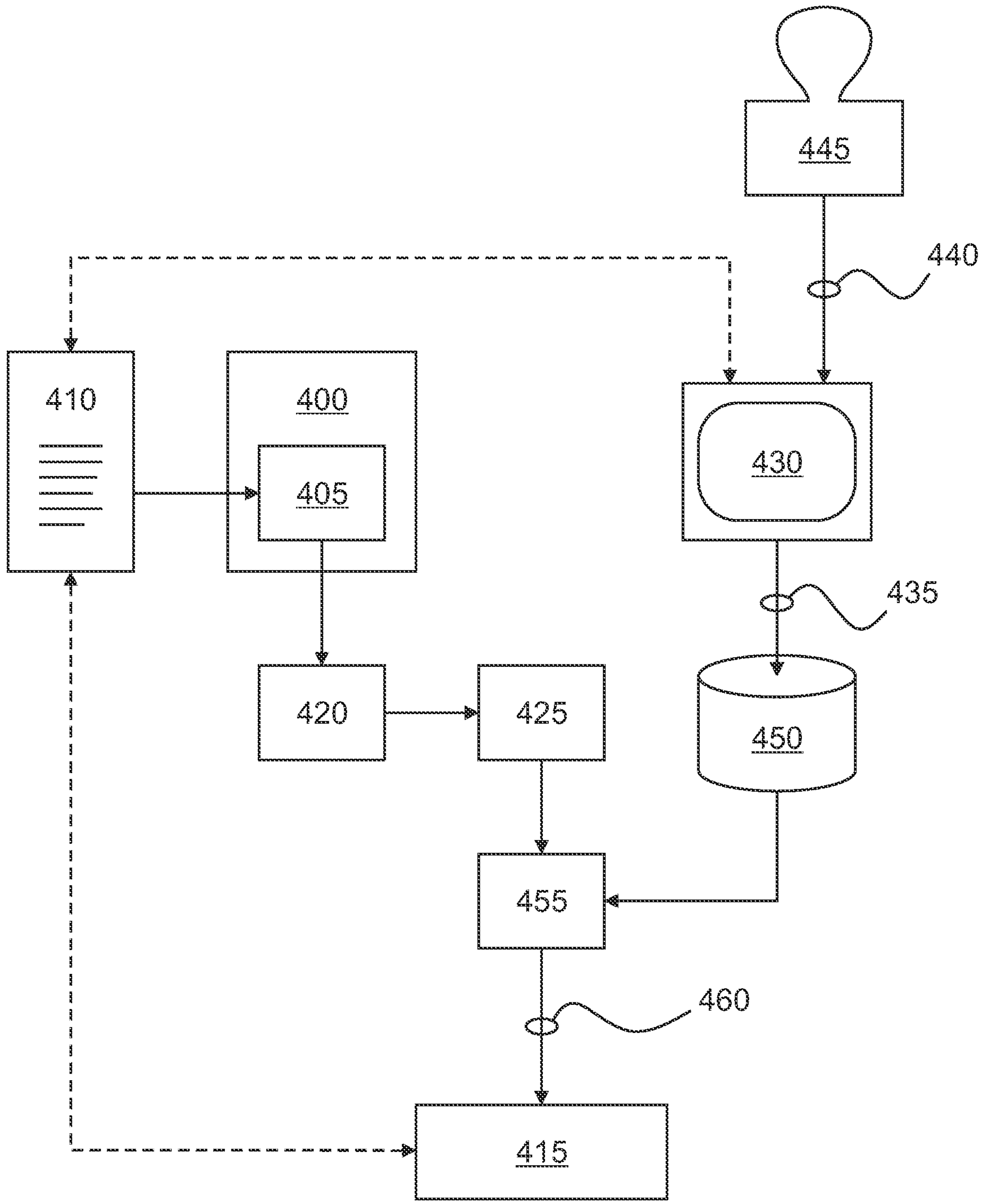
FIG. 4 shows the parameterisation of an IO-Link-based sensor arrangement, shown in FIG. 3, by means of an expert system according to the invention, and a corresponding configuration assistant, and specifically using a combined flow/block diagram.

The exemplary embodiment of method steps or corresponding device components of a configuration assistant 400 according to the invention shown in FIG. 4 is based on a machine learning approach 405, by means of which for a predetermined application scenario 410 of a sensor arrangement 415 described herein by way of example (see the three CM vibration sensors 300-310 in FIG. 3), both parameters 420 relevant for the parameterisation are determined and parameter values 425 suitable for the application scenario 410 are automatically determined for the parameters 420 determined in this way.

An optionally additionally present expert system approach 430, serves in particular to record or cache 450 data relating to the technical information or boundary conditions 435 required for the automated configuration or parameterisation of the three IO-Link devices (or sensor arrangement 415) shown in FIG. 3. The configuration or parameterisation takes place in particular in terms of the specific application scenario 410, and specifically through guided interaction 440 with a user 445 of the CM configuration assistant 400.

The CM configuration assistant 400 automatically creates a suitable parameter set 455 for the application from the inputs 440 of the user 445. The user 455 does not have to deal with the individual technical parameters and their significance, as it is customary with the current prior art. Therefore, a configuration with individual parameters, as is prior art practice, is not required. Subsequently, the parameter set 455 created in this way is uploaded 460 to the CM sensors 300-310 (or sensor arrangement 415) by means of the configuration assistant 400 and/or by means of the expert system 430. The uploading 460 of the parameter set 455 can thus be carried out in a single routine.

The data pre-processing of the vibration signals delivered by the CM sensors in the present exemplary embodiment subsequently takes place in the sensors and not in the IO-Link master. The configuration assistant can, for example, be embedded into an IO-Link master Webserver or an edge gateway firmware.

A parameter set created as described can be used directly with the CM sensors 300-310 concerned here, as these sensors have integrated parameter management. Wired interfaces with bidirectional communication, e.g. IO-Link or Modbus, or wireless interfaces, e.g. Bluetooth or Lora, can be considered as communication routes for the parameter set application.

The expert system described below asks basic questions which are generally easy for the user to answer. According to the method according to the invention, this input information is automatically enriched with expert knowledge about the application and transferred into a technical parameter set.

The method according to the invention for the automated parameterisation of an IO-Link device concerned here considerably reduces the effectiveness and efficiency of the configuration of complex IO-Link devices in particular.

Figure 5:
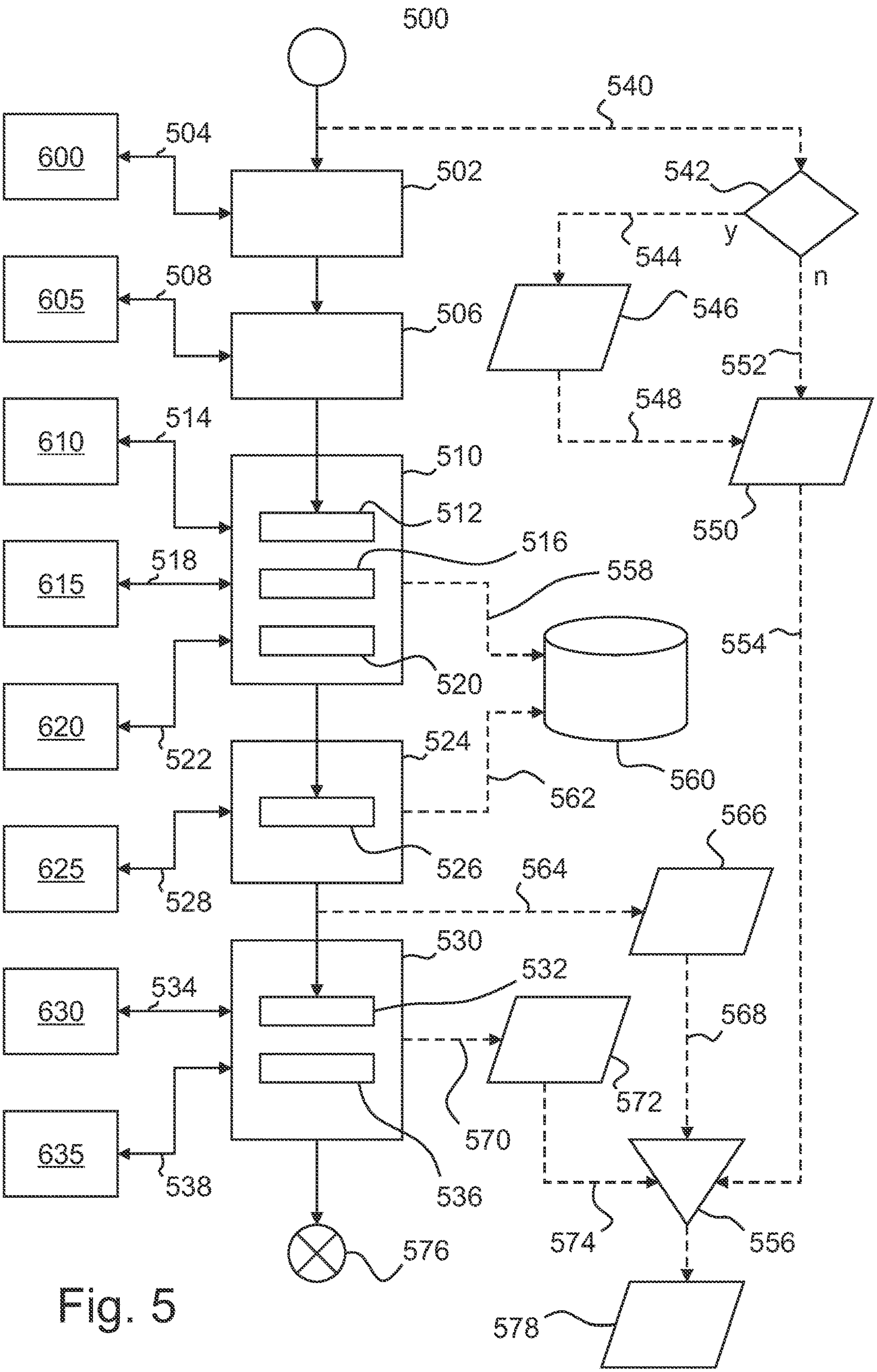
FIG. 5 shows an exemplary embodiment of an expert system according to the invention with a configuration assistant provided in the expert system, for an IO-Link-based state monitoring of a system or system component.

The exact mode of operation of the expert system described with a configuration assistant provided in the expert system, as well as the underlying machine learning approach or the corresponding rule-based learning approach, is described in greater detail below using an exemplary embodiment shown in FIG. 5.

After the start 500 of the configuration sequence or process shown, the underlying machine type of the IO-Link device available for the parameterisation is first detected 502, specifically in the present example of a monitoring device operated via an IO-Link for monitoring the operating state of technical equipment. It is also assumed that this equipment has parts that move in different spatial axes, e.g. the sensor technology developed or marketed by the applicant, such as corresponding inclination sensors with several measuring axes.

The machine type is preferably detected 502 as a result of input from the user, in the present exemplary embodiment using the configuration assistant realised by interactive function blocks 600-635. For this purpose, a bidirectional data exchange 504 with the first function block 600 takes place. Possible machine types include, for example, the machine categories motor, pump, fan and/or compressor.

The respective monitoring function of the IO-Link device to be parameterised is then recorded 506, also by user input via a second function block 605 connected via a bi-directional data exchange 508. Possible monitoring functions include, for example, the categories of mechanical vibrations of machines by measurements on non-rotating parts, e.g. of centrifugal pumps, in accordance with the ISO 10816.7 standard, and/or temperature values to be monitored, and/or user-specific signal peak values to be monitored and/or user-dependent root mean square (RMS) values to be monitored. This can be based on root mean square values of a time-varying physical variable, such as an alternating current or an alternating voltage.

This is followed by recording input data 510 also required for the parameterisation, which in the present exemplary embodiment includes the product category 512, the power class 516, and the axis assignment 520 of the IO-Link device concerned for the parameterisation.

In order to record the aforementioned three data inputs 512, 516, 520, a bi-directional data exchange 514, 518, 522 also takes place here with the corresponding function blocks 610, 615, 620. Pump categories such as, for example, "pump category I" and "pump category II" are provided in the third function block 610 in the present exemplary embodiment. In the fourth function block 615, by contrast, electrical performance classes are provided, in particular based on the respective number of rotor blades, for example a performance of 1-200 kW with >3 rotor blades, a performance of 201-1000 KW with >=3 rotor blades and/or a performance of >100 kW regardless of the number of rotor blades. Finally, one or two axes arranged perpendicular to the drive shaft of an electric drive of such a pump are provided or can be selected in the fifth function block 620.

Afterwards, the data is recorded with regards to the alarm settings 524, in particular corresponding to alarm values 526 based on underlying sensor data, to be supplied to the monitoring device connected via an IO-Link, for example in the case of IO-Link-based devices developed/distributed by the applicant. Therefore, an alarm can be triggered by means of so-called "smart sensor" technology when moisture enters the respective device. Therefore, it can be displayed, for example, that the device is located in an extreme environmental situation. In any case, the corresponding alarm levels have to be parameterised.

In order to record the aforementioned alarm values 526, bidirectional data exchange 528 also takes place with the sixth function block 625 concerned here. In this case, different risk categories according to a vulnerability level are predetermined in this function block 625. These, for example, could be based on a risk analysis, by means of which all hazards connected with a respective machine can be determined. A risk assessment is based on a series of logical steps, for example, according to DIN EN ISO 14121, which enables the systematic investigation of potential hazards, that are expected for the respective machine.

Lastly, in the present exemplary embodiment, data or values required are recorded for the data transmission 530, for example wireless data transmission, are recorded. In the present example, this data concerns control parameters for digital data transmission, for example the respective data transmission protocol to be used and the suitable transmission rate 532 and the designation of the application 536 underlying the data transmission.

In order to record both the mentioned input data items 532, 536, a bidirectional data exchange 534, 538 also takes place, here with the corresponding function blocks 630, 635. In the seventh block 630, the following data is automatically transmitted based on the current configuration of the monitoring device operated via an IO-Link for monitoring the operating state of technical equipment:

- process values, e.g. vibration amplitudes and/or vibration speeds (again as corresponding RMS values, as required);
- status bit, e.g. corresponding bits for the alarm areas "pre-alarm," "main alarm" and/or "hazard zones."

Subsequently, in the eighth function block 635, the exact designation of the respective application case is recorded on the user side. An example of this can be the "first monitoring function".

Based on all the configuration data now recorded for the parameterisation of the respectively present IO-Link devices, this data is now processed as indicated on the right side by the dashed line for the purpose of the automated creation of the final IO-Link parameters. A data line 540 is first used to check 542 whether the relevant monitoring function of the respective IO-Link device is to be parameterised for the first time. If this is the case, initial IO-Link parameters defined in advance are called up via a data line 544. In the next processing step 550, which is connected via further data lines 548, 552, corresponding IO-Link parameter data suitable for further processing is generated.

Simultaneously to the aforementioned process steps 542-550, the recorded input data 510, 524, i.e. the mentioned data 512, 516, 520, and the alarm-related data 526 is supplied to a database 560. In this knowledge-based database, possible applications of the IO-Link device, e.g. the monitoring use concerned here, are stored in a rule-based manner for this application-related data in the present exemplary embodiment.

Based on the rules corresponding to the currently present data 512, 516, 520, 526, IO-Link parameter data is generated 566 via a data line 564. Additionally, in the present exemplary embodiment, the mentioned data transmission 532, 536 is converted 572 via a data line 570 likewise into corresponding IO-Link parameter data.

Thus, present IO-Link parameter data available in total is subsequently combined or merged 556 via data lines 554, 568 and 574, and specifically as input data for a machine learning system trained in advance with corresponding data, i.e. an artificial neural network. As a result, the machine learning system automatically delivers the final IO-Link parameter data suitable for the present application (here monitoring application) of the IO-Link device.

It should be noted that the order of the process sequence 502-536 of the entire configuration or the corresponding functions blocks 600-635 (shown here) is only exemplary and can be modified if necessary.

The final generation 578 of the entire IO-Link parameters based on the data recorded as described thus takes place using the described machine learning approach based on empirically available rules, whereby these rules are also considered in a machine learning approach in a manner known per se. As a result, a parameter set suitable for the application is determined based on data entered by the user for the respective application, whereby in particular correlations between the underlying parameters are also considered.

The entire process sequence 502-578 finally ends 576 with the availability of the aforementioned result 578.

The invention claimed is:

1. Method for automated parameterisation of at least one IO-Link device connected, via an IO-Link connection using communication technology, to a device having IO-Link master functionalities for a predetermined intended use of the at least one IO-Link device (by means of a configuration assistant, the method comprising the steps:

on basis of the intended use by means of an expert system which is based on an artificial neural network and/or is rule-based, by means of which information relevant for the parameterisation is automatically determined by means of user inputs guided by a configuration assistant serving as a front end for the expert system, and a parameter set suitable for the preferably application-related intended use is automatically created for the parameterisation from the determined information relevant for the parameterisation.

2. Method according to claim 1, wherein the at least one IO-Link device is automatically configured for the predetermined intended use based on the transmitted parameter set.

3. Method according to claim 2, wherein the created parameter set is transmitted automatically to the at least one IO-Link device by means of the configuration assistant and/or by means of the expert system.

4. Method according to the claim 1, wherein a suitable parameter set is created using a machine learning approach.

5. Method according to claim 4, wherein on the basis of the information that is relevant for the parameterisation and dependent on the intended use, the machine learning approach is used to both determine parameters relevant for the parameterisation and to automatically determine parameter values that are suitable for the determined parameters.

6. Method according to claim 1, wherein the suitable parameter set is created in a rule-based manner.

7. Method according to claim 6, wherein on the basis of information that is relevant for the parameterisation and dependent on the intended use, parameters relevant for the parameterisation are determined and parameter values suitable for the determined parameters are determined in a rule-based manner.

8. Method according to claim 1, wherein dependencies or correlations between different parameters are considered when creating a parameter set suitable for the intended use.

9. Device for automated parameterisation of at least one IO-Link device connected to an IO-Link Master via an IO-Link using communication technology for a predetermined intended use of the at least one IO-Link device, said device comprising:

a configuration assistant which, using information relevant for the intended use, automatically creates a suitable parameter set for the parameterisation and automatically transmits the created parameter set to the at least one IO-Link device, wherein the configuration assistant works together with an expert system, by means of which the information relevant for the parameterisation is automatically determined by guided inputs made by a user.

10. The device according to claim 9, wherein at least one IO-Link device has an M12 plug connector which provides an IO-Link communications protocol, wherein the at least one IO-Link device has the ability to further process a created parameter set using data technology.

11. The device according to claim 9, wherein the at least one IO-Link device is connected to the IO-Link Master via a first bidirectional IO-Link connection using communication technology, wherein the IO-Link Master is connected to a higher-level IT network via a second bidirectional IO-Link connection for data or communication purposes.

12. The device according to claim 11, wherein the IO-Link Master is connected to a programmable logic controller via an ethernet or IP-based communication for data or communication purposes.

13. The device according to claim 11, wherein data delivered by the at least one IO-Link device is further processed and analysed by means of the IT network regarding the respective intended use.

14. The device according to claim 13, wherein the data delivered by the at least one IO-Link device is analysed in the IT network by means of an artificial neural network and/or by machine learning and/or in a rule-based manner.

15. The device according to claim 13, wherein data delivered by the IT network as a result of the analysis is automatically converted into control actions for a system or machine by means of a programmable logic controller.

* * * * *